United States Patent
Marchetti et al.

[15] 3,648,189
[45] Mar. 7, 1972

[54] AUTOMATIC BATTERY CHARGER CIRCUIT

[72] Inventors: John W. Marchetti, Cherry Hill, N.J.; Herbert H. Kiser, South Boro, Mass.

[73] Assignee: The Budd Company, Philadelphia, Pa.

[22] Filed: Apr. 27, 1970

[21] Appl. No.: 31,899

[52] U.S. Cl. .................................................. 320/39
[51] Int. Cl. ............................................... H02j 7/04
[58] Field of Search ............... 307/46, 66; 320/39, 40, 38, 320/37; 340/249; 324/29.5

[56] References Cited

UNITED STATES PATENTS

| 3,483,393 | 12/1969 | Gutzmer et al. | 307/66 |
| 3,392,317 | 7/1968 | Eberts et al. | 320/40 |
| 3,343,066 | 9/1967 | Cribbs | 320/40 |
| 3,205,422 | 9/1965 | Gold | 320/39 |
| 3,535,608 | 10/1970 | Cramer et al. | 320/31 |
| 3,287,175 | 11/1966 | Teed | 340/249 |
| 3,419,730 | 12/1968 | Cox | 307/66 |
| 3,531,707 | 9/1970 | Finnegan | 320/40 X |
| 3,395,288 | 7/1968 | Von Brimer | 320/40 X |
| 3,041,522 | 6/1962 | Beck et al. | 320/40 X |

Primary Examiner—William M. Shoop, Jr.
Attorney—Thomas I. Davenport, Edward M. Farrell and William R. Nolte

[57] ABSTRACT

A battery charger circuit uniquely applicable to those batteries having no change in any measurable physical constant as a function of their state of charge. It includes means for starting a charge and maintaining the charging current until the battery voltage has charged to a predetermined level and the charging current has dropped below a predetermined rate. Safety features relating to charging time, liquid level and excessive charging voltage are included to prevent the battery from charging under unsafe conditions.

10 Claims, 1 Drawing Figure

Patented March 7, 1972
3,648,189
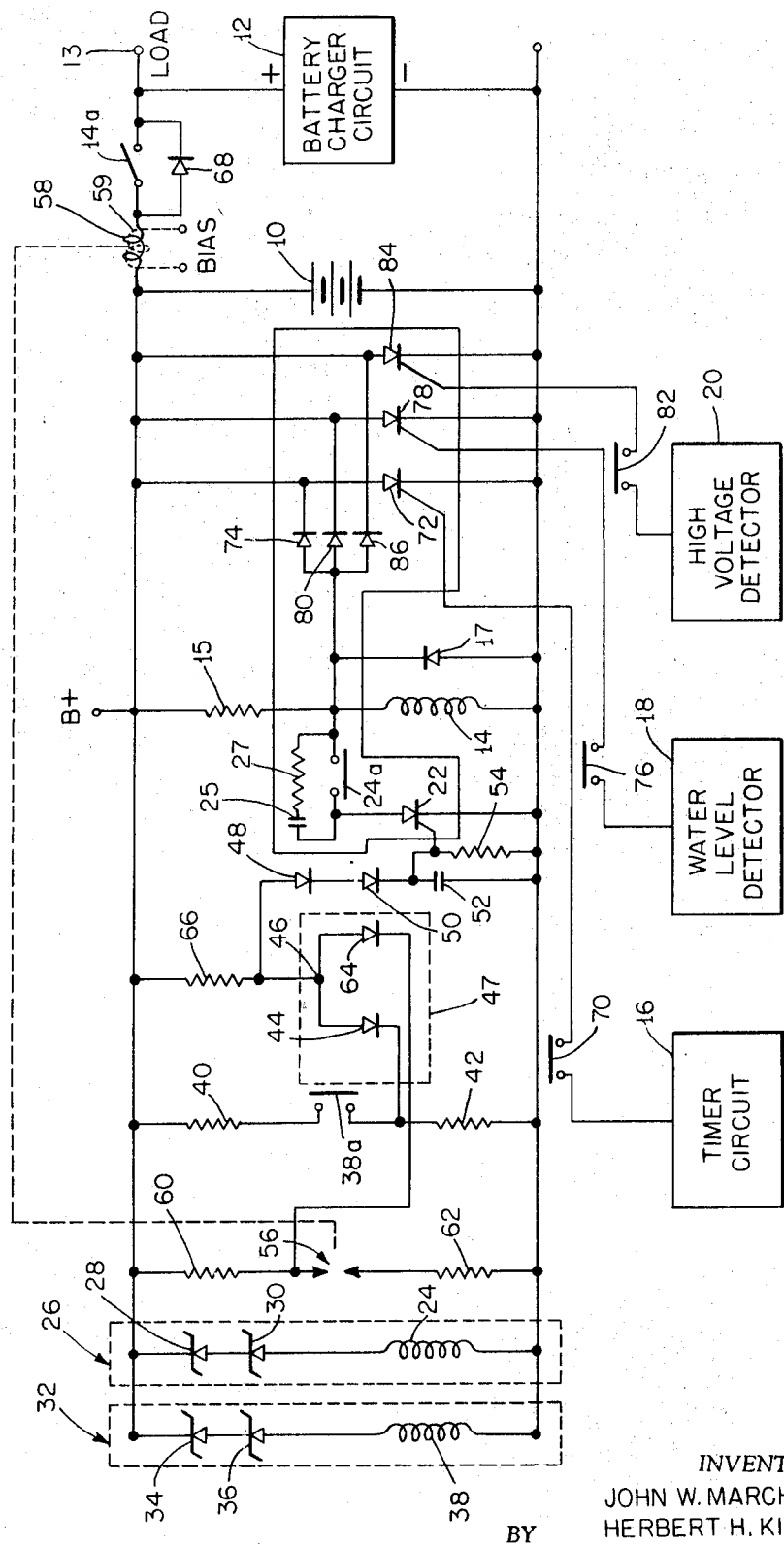
INVENTORS
JOHN W. MARCHETTI
HERBERT H. KISER
BY
Edward M. Farrell
ATTORNEY

AUTOMATIC BATTERY CHARGER CIRCUIT

Battery charger circuits have taken a wide variety of different forms. Many such circuits detect the voltage across the battery. When the battery voltage drops below a predetermined level, a fixed voltage source is connected to the battery and causes it to recharge to its original voltage level.

The charging of iron nickel alkaline batteries, of the type used in many railway cars, poses problems not normally found in lead batteries, such as used in automobiles. One of these problems relates to the detection of the true state of charge of the battery to determine whether or not the battery needs recharging. Ordinary measurements, such as voltage measurements across the battery are not sufficient because they are not capable of detecting the true state of charge of the battery. The reason for this is that such measurements must normally be taken under "no load" conditions where the internal resistance of the battery becomes an important factor. Also, gravity readings of the liquid in the battery do not give true indications of charge in iron alkaline types of batteries.

The charging of batteries used in railway trains presents special problems not normally found in other environments. For example, trains may be laid up and inactive for some time in a yard. This inactivity tends to cause the battery to discharge. Also, during the operation of the train, contact with the third rail, which provides the primary energy, may be disconnected as the train passes over various crossings or for other reasons. Further, poor transmission systems and emergency switching stations may prove to be defective causing discharge of batteries associated with trains.

In order to minimize the necessity of frequent examination of the state of charge batteries by maintenance personnel, it is desirable to have a system which will continuously detect the state of charge of the batteries and automatically charge them to their proper levels when they are discharged below certain levels.

In addition to automatically charging the batteries to their proper potentials, it is desirable to provide various safety precautions to assure that the batteries are not accidentally subjected to a charge when various unsafe conditions are present. For example, if the liquid level in the battery is too low, a charging current may cause permanent damage to the battery if a charging voltage is applied. Also, if the charge is maintained at too high a voltage, it may tend to cause the liquid in the battery to boil and evaporate and thereby cause permanent damage to the battery. Also, if the state of charge of the battery is not proper after a predetermined charging time, it generally indicates a fault within the battery or overall system, which should be checked, prior to continuing the charge. Consequently, continued charging of the battery after a predetermined time period may tend to cause permanent damage to the battery.

It is an object of this invention to provide an improved battery charger control circuit.

It is a further object of this invention to provide an improved battery charger control circuit wherein the battery will automatically commence charging when its voltage drops below a predetermined level and stop charging when a full charge is reached.

It is still a further object of this invention to provide an improved battery charger control circuit wherein the charging of the battery is prevented under unsafe conditions.

In accordance with the present invention, a charger circuit for charging a battery includes means responsive to the voltage level of the battery to selectively connect a source of power to the battery when the battery voltage level drops below a predetermined level. Voltage and current detector means are provided for detecting the voltage level and the charging current during the charging operation. Switching means are provided to discontinue the charging of said battery when the battery has reached a predetermined level and the charging current has dropped below a predetermined rate. Timing, liquid level detector, and excessive high voltage circuits may also be provided to prevent the battery from charging under unsafe conditions.

Other objects and advantages of the present invention will be apparent and suggest themselves to those skilled in the art, from a reading of the following specification and claims, in conjunction with the accompanying drawing, in which the sole figure of the drawing is a schematic diagram, partly in block diagram form illustrating one embodiment of the present invention.

The present invention will be described in connection with a battery charger control circuit for a railway train, it being apparent that the application could also be applied to other battery-charging systems. In such battery charger systems in trains, it is customary to have a power supply which may be considered the battery charger circuit. During operation of the train, voltages are generated by the power supply to maintain the battery charged during operation. The main source of power is often received from the third rail associated with the railway.

When the train has trouble and it is not capable of moving, no charge current is generally available to charge the battery. This may be caused by any one of a number of reasons. When this happens, the battery must supply power necessary to continue certain operations within the train. In emergencies, the battery supplies power necessary to continue the operation of such things as train safety controls, the communications system and lighting system. The battery power is not sufficient to provide the power required to move the train.

Basically, the subject invention relates to means for detecting the state of charge of a battery by detecting a voltage level of the battery as well as the current charging rate. If the voltage and current are at predetermined levels, it will indicate that the battery has been fully charged and that the charging cycle should be terminated.

The B+ source to which reference will be made may be that from the battery charger circuit 12, which in turn is operated by an external source, such as a third rail or overhead wire. The battery is only capable of being charged when the external source of power is present to operate the battery charger circuit. The external source of power may be very large, in the order of 600 volts, and stepped down to a lower operation voltage by the battery charger circuit 12. The DC voltage from the battery charger circuit may be between 43 and 45 volts, for example.

Referring to the drawing, first assume that a battery 10 is considered to be fully charged at 41 volts, it being understood that the figures mentioned are given merely as examples. If the voltage of the battery drops below 30.5 volts, for example, it will indicate that the battery is discharged and that a charging cycle should commence. A battery charger circuit 12 is capable of providing a voltage of 42 volts or higher, for example. The battery charger circuit may include various rectifiers for providing the direct current necessary to charge the battery 10. First assume that the battery voltage has dropped below some predetermined level, for example 30.5 volts, and requires a recharging cycle.

At this point, current flows through a coil 14, having a control diode 17 connected thereacross, to close a contact arm 14a as a result of voltage being applied across the coil 14 from a source of power indicated as B+ through a resistor 15. When the contact arm 14a is closed, a charging current will be delivered from the battery charger circuit 12 to the battery 10. This operation continues until current through the coil 14 ceases to flow causing the arm 14a to open. As will be hereinafter described, a number of circuits will prevent current from flowing in the coil 14 under certain conditions. Three of these conditions relate to a timer circuit 16, a water level detector circuit 18 and a high-voltage detector circuit 20. As will be seen, these three circuits indicate unsafe conditions for charging a battery.

The main circuit element for determining whether or not current will flow through the coil 14 includes a silicon-controlled rectifier (SCR) 22. This SCR will be either in a conducting or nonconducting state. When the contact arm 24a is closed and the input signals to the SCR 22 is of sufficient level it will become conducting. When the SCR is conducting the coil 14 is shorted and no substantial current flows therethrough. With no current through the coil 14, in the absence of any unsafe conditions, the battery 10 will normally be fully charged and not require any charge from the battery charger circuit 12.

As is well known, a silicon-controlled rectifier has a characteristic of maintaining a state of conduction once it starts conducting even after the input signal has been discontinued. In order to stop a silicon-controlled rectifier from conducting, it is generally necessary to take some positive action, for example disconnect the source of power from its anode. Thus, in the instant case opening the contact arm 24a disconnects B+ from the anode of the SCR 22 to cause it to be nonconducting.

The SCR 22 will not become conducting as a result of the closing of the arm 24a. The input voltage to the control electrode of the SCR 22 must exceed a predetermined level to cause the SCR 22 to conduct.

When the battery voltage has dropped below 30.5 volts, a recharge sensor circuit 26 responds to the drop in voltage. The recharge sensor circuit 26 includes Zener diodes 28, 30 and relay coil 24. The two diodes are used instead of one to provide convenient means for obtaining the precise breakdown voltage. Because of manufacturing tolerances involved in the commercially available diodes it is difficult to obtain a single diode with the precise breakdown voltage desired. Consequently, one of the diodes is selected with a breakdown voltage lower than but close to that desired, with the second being selected to provide the voltage difference between the first diode and the actual breakdown voltage.

The sensor circuit 26 is designed so that when the voltage thereacross extends 30.5 volts, current will flow through the zener diodes and the coils 24. The coil 24 actuates the arm 24a which is connected to the anode circuit of the SCR 22. As long as current flows through the coil 24, the contact arm 24a will be closed. However, when the current through the coil 24 ceases, the arm 24a will open causing the SCR 22 to become nonconducting.

It is noted that the current in the coil 24 and the closing of the contact arm 24a alone will not cause the SCR 22 to conduct in the absence of appropriate input signals to its control electrode. Thus even after current is resumed in the coil 24 as a result of the battery voltage rising above 30.5 volts, the recharging operation will continue until the input signal applied to the SCR 22 is of sufficient amplitude to drive it to a conducting state.

When the contact arm 24a is open and no unsafe conditions are present, current flows through the coil 14. This causes the battery 10 to charge as previously indicated. Because the input voltage to the control electrode of the SCR 22 is not of sufficient amplitude, it will maintain its nonconducting state even after the arm 24a has closed. As the battery charges, for example, current may again start to flow through the coil 24 to close the contact arm 24a. However, this will not have any effect upon the current through the coil 14 because the SCR 22 is in a nonconducting state.

In order to put the rectifier 22 in a conducting state and thereby discontinue a charging operation, two conditions must be met. The first condition is that the battery voltage rise to 41 volts, for example. A second condition is that the charging current from the battery charger 12 to the battery 10 must drop below some predetermined level, such as for example 10 amperes. With these two conditions met, the SCR 22 becomes conducting to produce a low-impedance path across the coil 14. With substantially no current through the coil 14, the arm 14a opens and the charging of the battery is discontinued.

A voltage level detector circuit 32 includes Zener diodes 34 and 36 and relay coil 38. When the voltage across the battery 10 is below 41 volts, for example, no current will flow in the voltage detector circuit 32 because the breakdown voltage level of the diodes is greater than 41 volts. However, when the level of 41 volts is exceeded, the Zener diodes 34 and 36 break down and current flows through the coil 38 to close contact arm 38a. A battery voltage above 41 volts indicates that the first condition indicating a proper charge of the battery 10 has been reached.

When the contact arm 38a closes, current flows through resistors 40 and 42 from the battery charger 12. The voltage developed across the resistor 42 is applied through a first diode 44 to point 46. The point 46 is connected to the battery through a resistor 66.

The voltage at point 46 is applied across a pair of diodes 48 and 50 and an RC network including a capacitor 52 and resistor 54. The voltage developed across the resistor 54 is applied to the control electrode of the SCR 22. The voltage across the resistor 54 must exceed a predetermined level before the SCR 22 will start to conduct. Closing of the arm 38a alone is not sufficient to produce the voltage necessary to trigger the SCR 22.

After the battery 10 has charged to the proper voltage and a first condition is satisfied, it is generally desirable to continue to charge the battery. For example, the battery voltage alone may not be a true indication as to its state of charge.

When the voltage from the battery charger circuit 12 is applied to the battery 10, the charging rate of current gradually decreases. After the charging current has decreased to some predetermined rate and the voltage exceeds a predetermined level, a proper charge of the battery 10 is generally indicated. Consequently, in the present invention, means are employed to detect the rate of charge of current from the battery charger circuit 12 to the battery 10 and to produce the second condition necessary to operate the SCR 22.

A current detector circuit includes a reed switch 56 adapted to be closed as a result of current passing through a coil 58 during a charging operation. A reverse bias winding 59 carrying current in the opposite direction to that of the coil 58 is also associated with the reed switch 56. However, when the current through the coil 58 is at a certain rate to overcome the bias or reverse current, the effective current through the coils 58 and 59 is enough to open the contacts of the reed switch 56. Thus the switch 56 will open when the charging current has dropped to some predetermined rate, for example, 10 amperes. Of course, other means for detecting the low-level current may also be employed to actuate a switch or relay to perform the same function as the reed switch.

Reed switches are well known to those skilled in the art. When a direct current voltage is connected to the coil associated with contacts, a current will flow in the coil. This develops a magnetic field within the coil and creates magnetic North and South poles on the reed contacts. As the current in the coil is increased, the pole strength increases and the attractive force between the North and South poles (Reed contact points) increases. At a critical value of current, the magnetic attraction force overcomes the spring forces and the contacts close. Action is regenerative because magnetic circuit reluctance decreases rapidly as contacts close. Further increase merely keeps the contacts closed.

When the applied voltage and hence the coil current are reduced, the magnetic forces can no longer overcome the spring forces and the contacts snap open. Thus, the pickup (closing) and dropout (opening) of the relay occurs when the delicate balance of forces is reached.

The magnetic force required to close the reed contacts is fixed for each reed configuration and is directly proportional to the product of coil current and the number of coil turns.

Now, if two concentric coils are used as illustrated in the drawing then the magnetic field is the sum of the fields created by each individual coil. When both currents are unidirectional, the sensor can be made to operate for charging currents that approach zero Amperes and for currents exceeding 50 Amperes.

When the contact 56 is closed, current flows from the source of B+ through resistor 60 and 62. The voltage developed across the resistor 62 is applied through a diode 64 to point 46. However, this voltage is insufficient to trigger the SCR 22.

With the reed switch 56 open and the contact arm 38a closed, the voltage at point 46 rises and causes the diodes 48 and 50 to conduct and a voltage to be developed across the resistor 54. The two diodes 44 and 64 may be considered as a form of AND-gate 47.

The operation of the diodes 44 and 64 are similar to the operation of many conventional AND-gate circuits found in computer systems, for example. The diodes may be considered as switches connected to point 46. When the switches 56 and 38a are open, both diodes 44 and 64 are conducting and the voltage at point 46 is low and not at a sufficient amplitude to trigger the SCR 22.

When the switch 56 closes, current flows through resistor 62 and the voltage drop thereacross causes the diode 64 to become nonconducting. However, because the diode 44 is still conducting, the voltage at point 46 remains low due to the low voltage across resistor 42.

When the switch 38a closes, the voltage drop across the resistor 42 increases causing the diode 44 to become nonconducting. With both diodes 44 and 64 nonconducting the voltage at point 46, which is that applied across the resistor 54 is of sufficient amplitude to cause the silicon control rectifier 22 to become conducting when the switch 24a is closed.

At this point, the voltage developed across the resistor 54 causes the SCR 22 to conduct. At this time, the voltage of the battery 10 has risen to the point to permit current to flow through the recharger sensor circuit 26. With current flowing in the coil 24, the arm 24a is closed. This permits the power to be applied to the anode of the rectifier 22 and permits it to become conducting. The capacitor 25 and resistor 29 connected across the contacts associated with the arm 24a are to handle the abrupt current surges generated during the making and breaking of the contacts.

When the SCR 22 is in a conducting state, it effectively shorts out the coil 14 thereby causing the arm 14a to open. This terminates the charging current from the battery charger circuit 12 to the battery 10. A diode 68 is connected across the arm 14a to permit the battery to supply the load to the load 13 current when the charger 12 is inoperative.

A number of safety features are involved in the subject invention to assure that the battery 10 will not be charged if certain unsafe conditions are present. A first feature involves a timer circuit 16.

The timer circuit 16 is adapted to close contact arm 70 after a predetermined time unless the battery becomes fully charged within the alloted time in which case the timer becomes inoperative and the contact arm 70 remains open. The time may be in the order of 6 or 7 hours when a normal charging time is in the order of 4 to 5 hours. Closing of the contact arm 70 causes an SCR 72 to become conducting. The conduction of the SCR 72 effectively shorts out the coil 14 through a diode 74. In turn the contact arm 14a is opened to prevent the battery from charging.

The reason for the timer circuit is that the battery 10 should normally indicate a state of charge within a reasonable time. If this state of charge is not indicated within such reasonable period, it generally indicates that there is a fault within the system which should be investigated. Consequently, the charging of the battery from boiling away or the battery 10 from becoming overcharged or otherwise permanently damage the battery. A light (not illustrated) may be associated with the timer circuit 16 indicating a fault for a maintenance man.

A second safety feature related to the subject invention involves a water-level detector 18 which is adapted to close a contact arm 76 when the water level in the battery drops below some safe level. Under these conditions, an SCR 78 is caused to conduct. This effectively shorts out the coil 14 through a diode 80 and prevents the battery 10 from charging.

A third safety feature relating to the present invention involves a high-voltage detector circuit 20. This circuit may be similar to the voltage-level detector circuit 32 but designed to operate at a higher voltage level. If the battery charges to too high a voltage because of some fault within the system, the high-voltage detector circuit 20 becomes operative. For example, this circuit could become operative if the voltage of the battery rises to 45.5 volts. Upon operation of the high-voltage detector 20, contact arm 82 is closed and an SCR 84 becomes conducting. When it is conducting, the SCR 84 effectively shorts out the coil 14 through a diode 86. This prevents the battery 10 from charging.

Thus it is seen that the subject invention in addition to providing a novel battery charger circuit also incorporates a number of safety features relating to timing, water level and high-voltage detection.

What is claimed is:

1. In combination with a charger circuit for charging a battery, means responsive to the voltage level of said battery for selectively connecting a source of power to charge said battery when said voltage level drops below a predetermined level, voltage detector means for detecting the voltage level of said battery during said charging operation, current detector means for detecting the charging current of said battery during said charging operation, circuit means responsive to said voltage and current detectors to discontinue the charging of said battery when said battery has reached a predetermined level and said charging current has dropped below a predetermined rate wherein said circuit means includes a switching means for controlling the current path between said charger circuit and said battery, and said switching means includes a coil for operating a switch.

2. The invention as set forth in claim 1 wherein said switching means further includes a silicon control rectifier for controlling the current flow through said coil to operate said switch.

3. In combination with a charger circuit for charging a battery, means responsive to the voltage level of said battery for selectively connecting a source of power to charge said battery when said voltage level drops below a predetermined level, voltage detector means for detecting the voltage level of said battery during said charging operation, current detector means for detecting the charging current of said battery during said charging operation, circuit means including switching means, said switching means including a coil for operating a switch for controlling the current path between said charger circuit and said battery, said switching means further including a silicon control rectifier for controlling the current through said coil to operate said switch, an AND-gate circuit to trigger said silicon control rectified from a nonconducting state to a conducting state when the voltage across said battery exceeds a predetermined level and the charging current from said charger circuit to said battery drops below a predetermined rate, said circuit means being responsive to signals from said voltage and current detectors to discontinue the charging of said battery when said battery has reached a predetermined level and said charging current has dropped below a predetermined rate.

4. The invention as set forth in claim 3 wherein a voltage detector for detecting said predetermined voltage level is provided and includes normally nonconducting Zener diode means, means to apply the voltage across said battery to switch said Zener diode to a conducting state to generate a first signal, and means for applying said first signal to said AND-gate circuit.

5. The invention as set forth in claim 4 wherein a current detector includes a coil responsive to charging current to operate a reed switch to generate a second signal when said charging current drops below a predetermined rate, and means for applying said second signal to said AND-gate circuit.

6. The invention as set forth in claim 5 wherein a low-voltage detector comprises second normally conducting Zener diode means, means for applying the voltage across said battery to said second Zener diode means, said Zener diode means becoming nonconducting when said battery voltage drops below a predetermined minimum level, said second Zener diode means causing said silicon control rectifier to become nonconducting when said second Zener diode means is nonconducting.

7. The invention as set forth in claim 6 wherein the output circuit of said silicon control rectifier includes a contact switch operative by said second Zener diode means.

8. The invention as set forth in claim 7 wherein a liquid level detector circuit for detecting the liquid level of said battery and to provide a low-impedance path across said coil when said liquid level is too low to prevent charging of said battery is provided.

9. The invention as set forth in claim 8 wherein a timer circuit is provided to limit the charging time of said battery, said timer circuit providing a low-impedance path across said coils when the charging time of said battery reaches a preset time thereby preventing the charging of said battery.

10. The invention as set forth in claim 9 wherein a high-voltage detector circuit detects a high predetermined level of said battery and provides a low-impedance path across said coil when said high predetermined level is exceeded thereby preventing the charging of said battery.

* * * * *